Sept. 23, 1930.                R. HOLDEN                1,776,626
             SHUTTLE RELEASING MOTION OF LOOMS FOR WEAVING
                           Filed June 4, 1929
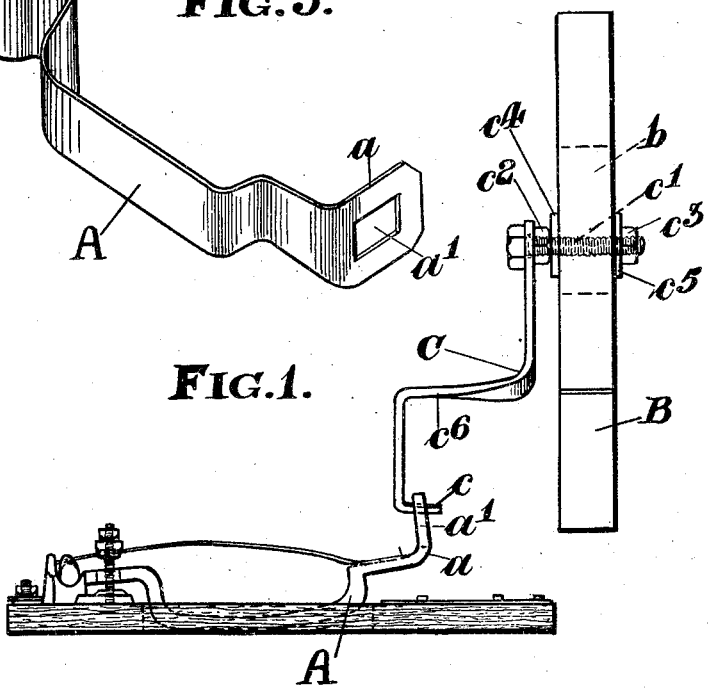
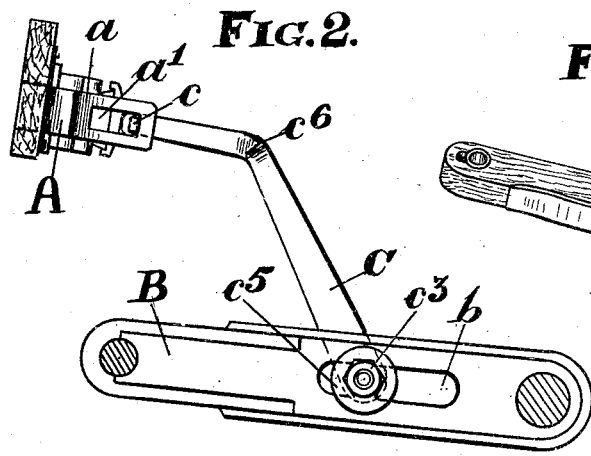
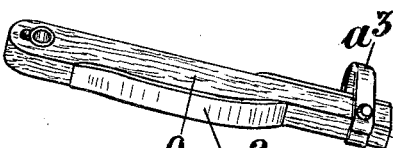
INVENTOR:
Richard Holden
by Monroe E. Miller
        Atty.

Patented Sept. 23, 1930

1,776,626

UNITED STATES PATENT OFFICE

RICHARD HOLDEN, OF BLACKBURN, ENGLAND

SHUTTLE-RELEASING MOTION OF LOOMS FOR WEAVING

Application filed June 4, 1929, Serial No. 368,327, and in Great Britain February 27, 1929.

This invention relates to a loom shuttle releasing motion and has for its chief object to introduce a simple and efficient device for preventing the swell from exerting pressure upon the shuttle when the action of picking takes place, thereby causing a much easier running loom, effecting a great saving in wear and breakage of pickers, picking bands, picking cams and all parts appertaining to the picking apparatus and providing an effective cure for a large number of loom faults, such for example as shuttle lifting, flying out of the shed; turning over; the number of weft breakages are also considerably reduced.

According to this invention the swell is retracted by a connection actuated from the connecting rod when the shuttle is being picked out of the box.

In the accompanying drawings:—

Fig. 1 is a plan, and Fig. 2 an elevation of a loom shuttle releasing motion constructed in accordance with this invention.

Fig. 3 is a perspective view of a sheet metal swell adapted for use with the shuttle releasing motion and Fig. 4 is a similar view of a leather coated wooden swell as used in the weaving of artificial silk.

A indicates the swell, B the connecting rod, and C the connection.

The swell A, is cranked at $a$ and in such portion is a hole or slot $a^1$ for the passage of a cranked end $c$ of the connection C which is made in the form of a link pivoted on a bolt or stud $c^1$ that passes through the loom connecting rod B and is fixed thereto in any adjusted position. In the example shown the bolt or stud $c^1$ is fitted with two nuts $c^2$ $c^3$. The nut $c^2$ is adjusted to provide sufficient space between it and the bolt head to allow the link C to turn freely on the bolt. A washer $c^4$ is then threaded on to the bolt, the latter passed through a slot $b$ in the connecting rod, another washer $c^5$ placed on the end of the bolt. The nut $c^3$ is then screwed on to the end of the bolt and tightened up thereby clamping the bolt securely in position in the connecting rod. The intermediate portion of the link C may be cranked as shown at $c^6$ to bring the end $c$ into alignment with the hole or slot in the swell through which it has to pass. When the loom is in motion a certain amount of lost motion takes place between the link C and the swell and each time the free end $c$ of the link engages the swell as the connecting rod is moving back it retracts the swell from the shuttle during the time that the latter is being picked out of the box. The invention can be applied to any swell and in applying it to existing swells, the part through which the link passes may be made in the form of an attachment to the swell. Fig. 3 shows a sheet metal swell bent at $a$ and formed with a hole $a^1$ to engage the cranked end $c$ of the link. The invention is especially applicable to any automatic loom, where a wood swell coated with a strip of leather $a^2$ is used, on account of the extra swell pressure required on this type of loom. To adapt a swell of this type for operation from the connecting rod it is fitted with a loop $a^3$ to engage the cranked end $c$ of the link.

What I claim as my invention, and desire to secure by Letters Patent is:—

An attachment to a loom connecting rod for retracting the swell when the shuttle is being picked out of the box, comprising a cranked member terminating at one end in a hook for engagement with an aperture or slot in the loom swell, a bolt passing through the other terminal of said member, and means for clamping the bolt to the loom connecting rod whilst allowing the cranked member to swing freely on the bolt.

In testimony whereof I hereunto affix my signature.

RICHARD HOLDEN.